United States Patent [19]

Callahan, Jr. et al.

[11] Patent Number: 5,536,786
[45] Date of Patent: Jul. 16, 1996

[54] ADHESIVE BEADS

[75] Inventors: Joseph P. Callahan, Jr., St. Paul; Rudyard M. Enanoza, Woodbury; Mark D. Weigel, Vadnais Heights, all of Minn.

[73] Assignee: Minnesota Mining and Manufacturing Company, St. Paul, Minn.

[21] Appl. No.: 232,698

[22] Filed: Apr. 25, 1994

Related U.S. Application Data

[62] Division of Ser. No. 28,338, Mar. 9, 1993, Pat. No. 5,322,731.

[51] Int. Cl.⁶ .................. C08L 33/02; C08L 33/06; C08L 39/06; C08L 25/18
[52] U.S. Cl. .................. 525/221; 525/212; 525/218; 525/227; 525/223; 525/274; 525/283; 525/296; 525/302; 525/309; 525/317; 525/205
[58] Field of Search .................. 525/221, 227, 525/223, 203, 309, 302, 317, 279, 274, 296, 205, 212, 218

[56] References Cited

U.S. PATENT DOCUMENTS

| | | | |
|---|---|---|---|
| 2,907,682 | 10/1959 | Eichel | 117/122 |
| 2,986,477 | 5/1961 | Eichel | 117/122 |
| 2,988,460 | 6/1961 | Eichel | 117/122 |
| 2,988,461 | 6/1961 | Eichel | 117/122 |
| 4,091,162 | 5/1978 | Henderson et al. | 428/327 |
| 4,359,492 | 11/1982 | Schlademan | 427/222 |
| 4,421,901 | 12/1983 | Lindner et al. | 525/309 |
| 4,456,734 | 6/1984 | Lindner et al. | 525/310 |
| 4,833,179 | 5/1989 | Young et al. | 522/183 |
| 4,851,278 | 7/1989 | Enanoza | 428/195 |
| 4,952,650 | 8/1990 | Young et al. | 526/194 |

FOREIGN PATENT DOCUMENTS

| | | |
|---|---|---|
| 60-124679 | 7/1985 | Japan . |
| 63-273680 | 11/1988 | Japan . |
| HEI2-102290 | 4/1990 | Japan . |
| 2167383 | 6/1990 | Japan . |
| HEI2-292380 | 12/1990 | Japan . |
| 4174861 | 6/1992 | Japan . |
| 4182663 | 6/1992 | Japan . |
| 989264 | 4/1965 | United Kingdom . |

*Primary Examiner*—Vasu S. Jagannathan
*Attorney, Agent, or Firm*—Gary L. Griswold; Walter N. Kirn; Steven E. Skolnick

[57] ABSTRACT

Adhesive beads comprise a core comprising a pressure sensitive adhesive material and an essentially discontinuous organic polymer disposed about the core. The beads are free-flowing at room temperature. Upon application of heat and/or pressure the core is activated and blends with the coating to provide a pressure sensitive adhesive.

21 Claims, 2 Drawing Sheets

ADHESIVE BEADS

This is a division of application Ser. No. 08/028,338 filed Mar. 9, 1993.

BACKGROUND OF THE INVENTION

1. Field of the Invention

This invention relates to adhesive beads and, more particularly, to adhesive beads which comprise a pressure sensitive adhesive core material and a nontacky coating that surrounds the core.

2. Description of the Related Art

Microencapsulated adhesive beads are generally understood to comprise a continuous shell which surrounds or encapsulates a liquid or solid adhesive core. The shell is impervious to the core material and is sufficiently strong so as to prevent exposure of the core during normal handling of the beads. However, upon the application of heat, pressure, mechanical force or the like, the shell fractures, ruptures, dissolves or is absorbed by the core, thereby exposing the core. Microencapsulation is discussed in *Microcapsules and Microencapsulation Techniques* by M. H. Gutcho (published by Noyes Data Corporation, Park Ridge, N.J., 1976) and *Microcapsule Processing and Technology* by A. Kondo (edited by J. W. Van Valkenburg, published by Marcel Dekker, Inc., New York, N.Y., 1979).

Two commonly employed techniques for producing microencapsulated adhesive beads are coacervation and in situ polymerization. In coacervation, a continuous shell is formed when a water soluble polymer is condensed from an aqueous solution. The shell forms about a nucleus of material which becomes the core. Shells based on gelatin and gum arabic are well known.

For example, U.S. Pat. No. 2,907,682, "Adhesive Tape Containing Pressure Rupturable Capsules," issued Oct. 6, 1959 to H. J. Eichel discloses an adhesive tape comprising a web having a coating of two kinds of pressure-rupturable capsules thereon. One type of capsule contains a liquid solvent; the other contains a substantially solid adhesive which is soluble in the solvent. When pressure is applied to the tape, the capsules rupture and the adhesive and the solvent become mixed. The capsules include a hard shell formed by coacervation from gelatin and gum arabic.

U.S. Pat. No. 2,988,460, "Adhesive Tape," issued Jun. 13, 1961 to H. J. Eichel discloses an adhesive tape comprising a web coated with pressure-fracturable capsules. Each capsule includes a hard shell which surrounds an adhesive core. The capsules are formed by coacervation. Upon the application of pressure the shells fracture, and with the subsequent application of heat above 100° F. (37.8° C.) the adhesive cores become tacky and flow. U.S. Pat. No. 2,988,461, "Adhesive," issued Jun. 13, 1961 to H. J. Eichel is similar to the immediately preceding patent except that the application of heat is apparently not required to activate the adhesive.

Japanese Kokai Patent No. 63-273680, "Capsule Type Adhesive and Adhesion Method Using Capsule Type Adhesive," published Nov. 10, 1988 discloses an oil with an adhesive dissolved therein. The oil is sealed in a gelatin capsule. Applying pressure to the capsule causes the same to break thereby releasing the oil/adhesive blend.

Japanese Patent Publication No. 60-124679, "Pressure Sensitive Adhesive Sheet," published Jul. 3, 1985 discloses several adhesive microcapsules. For example, drawing FIG. 2(d) illustrates a pressure sensitive adhesive core covered by a fine inorganic powder and then encapsulated by a polymer film which is obtained by coacervation. Pressure is applied to the microcapsule to expose the adhesive core.

In situ polymerization is a second commonly employed technique for producing microencapsulated adhesive beads. A shell formed of a gaseous, liquid, water or oil soluble monomer or a low molecular weight polymer is polymerized on the surface of a core material to provide a polymer film which covers the entire surface of the core material. A variety of materials including homopolymers, copolymers, graft copolymers and block copolymers may be used to form the shell. Shells based on urea-formaldehyde are well known.

For example, British Patent Specification No. 989,264, "Microcapsules and Method of Producing Them," published Apr. 14, 1965 discloses microcapsules comprising discrete, distinct and continuous aminoplast shell walls upon water-immiscible inert solid or liquid fill particles. In situ polymerization is also mentioned in Japanese Kokai Patent No. 2-102280, "Microencapsulated Pressure Sensitive Adhesive Agent," published Apr. 13, 1990 which discloses a pressure sensitive adhesive agent and a non-pressure sensitive adhesive shell which surrounds the agent. Japanese Kokai Patent No. 2-292380 contains similar disclosure.

Adhesive beads are discussed in other publications. For example, U.S. Pat. No. 4,091,162, "Adhesives," issued May 23, 1978 to Henderson et al. discloses a "core-shell" polymer particle comprising a soft, tacky polymeric core surrounded by a hard, nontacky, nonblocking polymeric shell. The particles may be formed by polymerizing the core followed by polymerizing the shell about the core. A typical "core-shell" polymer particle is illustrated in FIG. 1 of the Henderson et al. patent. Japanese Kokai Patent No. 2-102280 mentions a similar technique for producing a structure which includes a pressure sensitive adhesive agent and a nonadhesive shell.

The above-mentioned Japanese Patent Publication No. 60-124679 discloses three adhesive microcapsules other than the coacervate structure illustrated in drawing FIG. 2(d). Drawing FIG. 2(a) shows an adhesive microcapsule in which a frozen and ground pressure sensitive adhesive is mixed with a resinlike or terpenelike resin to form a powder that reportedly flows well at room temperature. The microcapsule illustrated in drawing FIG. 2(b) apparently comprises the microcapsule of FIG. 2(a) further covered with a fine inorganic powder such as silica, bentonite, alumina or talc to enhance the flowability of the microcapsules. The microcapsule of drawing FIG. 2(c) comprises a pressure sensitive adhesive core covered with a fine inorganic powder.

U.S. Pat. No. 4,833,179 and its division 4,952,650, "Suspension Polymerization," each to Young et al. and issued, respectively, May 23, 1989 and Aug. 28, 1990 disclose the production of pressure sensitive adhesive beads by suspension polymerization. The beads may include a hydrophobic silica coating. A filtration product comprising the beads and water is nonagglomerating but the beads are inherently and permanently tacky when dried.

It would be advantageous to provide beads having pressure sensitive adhesive qualities but which do not have a tacky exterior surface. Such beads could be more easily processed by spray drying equipment or supplied to a hopper feeder. Furthermore, these beads would be free from packaging disabilities associated with 100% solids pressure sensitive adhesives in that special release liners or pail or drum unloaders would not be required to deliver the beads from their packing container for use. Moreover, if the beads were a 100% solids system, they could be readily applied to a substrate by dusting or other dry coating techniques, thereby eliminating the need for aqueous or solvent based suspensions that must be dried once the adhesive has been applied. Such beads, however, should be easily activated and not rendered nontacky in a manner that detrimentally affects their ultimate adhesion.

SUMMARY OF THE INVENTION

This invention relates generally to an adhesive bead which comprises a core that comprises a pressure sensitive adhesive, and an essentially discontinuous organic polymer coating which is disposed about the core. The discontinuous organic polymer coating renders the bead nontacky to the touch and free-flowing at room temperature. However, upon the application of heat and/or pressure to the bead, the adhesive core flows, becomes exposed, and forms a compatible blend with the coating. Adhesive beads according to the invention are useful in any application in which a pressure sensitive adhesive would have utility.

Preferably, the adhesive core comprises the reaction product of an alkyl acrylate, an alkyl fumarate, or an alkyl maleate, and a functional monomer copolymerizable therewith. Alkyl acrylates are preferred. The copolymerizable functional monomer is preferably polar and includes materials such as acrylic acid, methacrylic acid, acrylamides and substituted acrylamides. Moderately polar monomers such as N-vinyl lactams may also be used. Other useful adhesive core materials include vinyl ether polymers, silicone pressure sensitive adhesives, and various natural and elastomeric rubbers.

The essentially discontinuous organic coating may be derived from an organic polymer latex, a solvent dispersion of an organic polymer, or a granulated organic polymer. The polymer may be a thermoplastic homopolymer or a thermoplastic copolymer and may be derived from the reaction of a vinyl group or an acrylate group-containing monomer, and a polar comonomer copolymerizable therewith. Preferably, the coating has a glass transition temperature greater than or equal to about 25° C., more preferably greater than about 90° C.

Because the beads are free-flowing at room temperature, they may be readily supplied to a hopper feeder for extrusion to form a compatible melt blend. When coated in this way, maximum adhesion may be realized. Special delivery systems are not required to supply the beads.

Advantageously, the beads may be coated as a 100% solids systems or in dry granular form, thereby eliminating the need for aqueous or solvent based systems that must be subsequently dried. However, the adhesive beads may also be coated from a dispersion. The application of heat and/or pressure exposes the pressure sensitive adhesive core by displacing the essentially discontinuous polymer coating to provide a compatible adhesive blend. Varying the heat and/or pressure applied to the beads can alter the adhesive characteristics of the same, thereby tailoring the adhesive qualities of the beads for specific applications.

Preferably, the pressure sensitive adhesive cores are formed by suspension polymerizing appropriate starting materials. If the coating is derived from an organic polymer latex, it is preferably formed by emulsion or suspension polymerization. The latex may be combined with previously formed and filtered adhesive cores. Alternatively, the polymerization that provides the latex may be carried out in the presence of the adhesive cores. In yet another approach, the polymerization which provides the coating may be carried out subsequent to or along with the polymerization which provides the adhesive cores.

In another embodiment, a bulk pressure sensitive adhesive may be frozen and ground so as to supply the adhesive cores.

Adhesive beads according to the invention have been observed to be electrostatically chargeable.

BRIEF DESCRIPTION OF THE DRAWINGS

The invention will be more fully understood with reference to the following drawings in which similar reference numerals designate analogous or corresponding components throughout and in which.

DETAILED DESCRIPTION OF THE PREFERRED EMBODIMENTS

Figure 1:
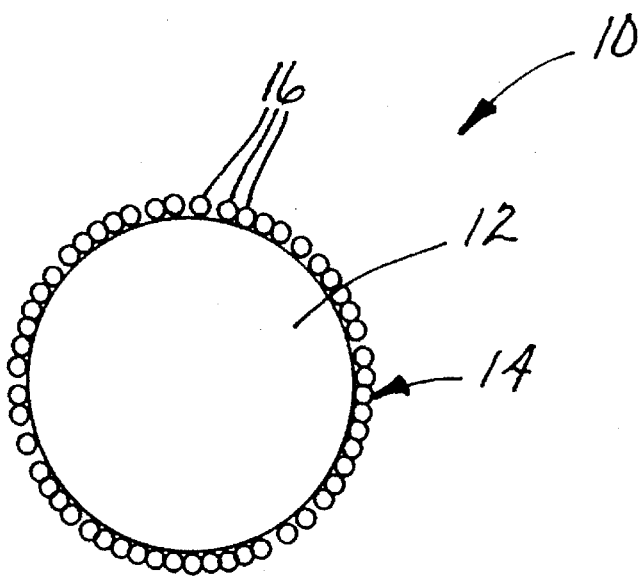
FIG. 1 is a schematic cross-sectional view of an adhesive bead according to the invention.

Turning now to the drawings, FIG. 1 illustrates an adhesive bead 10 according to the invention. Adhesive bead 10 comprises a core 12 that comprises a pressure sensitive adhesive material, and an essentially discontinuous organic polymer coating 14 disposed about the core.

Core 12 will sometimes be referred to herein as "the pressure sensitive adhesive core," it being understood that this means that the core comprises a pressure sensitive adhesive material. As used herein, "pressure sensitive adhesive material" means a material which displays pressure sensitive tack; that is, a material which is tacky when touched with light pressure. However, as explained below, coating 14 renders bead 10 nontacky.

In general, the pressure sensitive adhesive core may be provided by a wide variety of materials. For example, the core may be derived from polyacrylates, vinyl ether polymers, silicone pressure sensitive adhesives, natural rubbers, styrene-butadiene block copolymers, and elastomeric rubbers (e.g., butyl rubber and polyisobutylene), as well as blends and mixtures of these materials. Various plasticizers and/or tackifiers may be incorporated into or blended with the core material(s) so as to balance the ultimate pressure sensitive adhesive properties.

In one embodiment, the pressure sensitive adhesive core may be prepared by an aqueous suspension polymerization process similar to that disclosed in U.S. Pat. No. 4,833,179 and U.S. Pat. No. 4,952,650, which patents are hereby incorporated by reference. In general, the suspension polymerization technique described in these patents involves the steps of:

(1) preparing a monomer premix comprising:
  (a) one or more acrylic acid esters of a non-tertiary alcohol, the alcohol having from 1 to 18 carbon atoms, with the average number of carbon atoms being about 4 to about 12;

(b) a functional monomer copolymerizable with the acrylic acid ester;

(c) a free-radical initiator; and (d) a chain transfer agent;

(2) combining the premix with a water phase containing a dispersion aid and/or a stabilizer to form a suspension; and (3) concurrently agitating the suspension to permit the polymerization of the monomer premix until the pressure sensitive adhesive cores form.

Alkyl acrylate monomers (i.e., acrylic acid ester monomers) useful in the present invention include monofunctional, unsaturated acrylate ester monomers. Included within this class of monomers are, for example, n-butyl acrylate, hexyl acrylate, isooctyl acrylate, 2-ethylhexyl acrylate, isononyl acrylate, decyl acrylate, dodecyl acrylate, and mixtures thereof. Preferred monomers include n-butyl acrylate, isooctyl acrylate and isononyl acrylate. The acrylate monomers preferably comprise at least about 70 parts based on 100 parts total monomer content, more preferably from about 75 parts to about 90 parts. Unless indicated otherwise, all parts are parts by weight.

While acrylic acid esters are preferred, alkyl maleates and alkyl fumarates (based, respectively, on maleic and fumaric acid) may be successfully used in accordance with the invention. In this regard, dibutyl maleate, dioctyl maleate, dibutyl fumarate and dioctyl fumarate, are preferred.

The functional monomer copolymerizable with the acrylic acid ester, the fumaric acid ester, or the maleic acid ester is incorporated into the monomer premix so as to modify a final property (for example, peel adhesion or shear holding strength) of the resulting adhesive core. The functional monomer may be a polar monomer. "Polar monomers" include both moderately polar and strongly polar monomers. Polarity (i.e., hydrogen-bonding ability) is frequently described by the use of terms such as "strongly," "moderately" and "poorly." References describing these and other solubility terms include "Solvents," *Paint Testing Manual*, 3rd Ed G. G. Seward, Editor, American Society for Testing and Materials, Philadelphia, Pa., and "A Three-Dimensional Approach to Solubility," *Journal of Paint Technology*, Vol. 38, No. 496, pp. 269–280.

Strongly polar monomers useful herein include acrylic acid, methacrylic acid, itaconic acid, hydroxyalkyl acrylates, styrene sulfonic acid or the sodium salt thereof, maleic acid, fumaric acid, citraconic acid, acrylamides, and substituted acrylamides. Preferred polar monomers include acrylic acid, methacrylic acid, acrylamides and substituted acrylamides. Moderately polar monomers useful herein include N-vinyl lactams such as N-vinyl pyrrolidone, N-vinyl caprolactam, acrylonitrile, and dimethyl amino-propyl methacrylate.

Other monomeric materials which may be used as the functional monomer include macromers of the type disclosed in U.S. Pat. No. 3,786,116 such as 1-polystyrylethyl methacrylate, vinyl esters such as vinyl acetate and vinyl chloride, dialkyl maleates such as dioctyl maleate and dibutyl maleate, dialkyl fumarates such as dioctyl fumarate and dibutyl fumarate, and alkyl methacrylates such as methyl methacrylate.

Mixtures of any of the above noted functional monomers may also be employed. For example, a preferred functional monomer comprises a blend of vinyl acetate, methyl methacrylate and methacrylic acid. The functional monomer may comprise up to about 30 parts by weight of the premix based on the total monomer content, preferably from about 10 to about 25 parts by weight.

Initiators for polymerizing the monomers to provide adhesive cores useful in the invention are those which are normally suitable for free-radical polymerization of acrylate, fumarate and maleate monomers and which are oil-soluble and have low solubility in water. Useful examples include organic peroxides (e.g., benzoyl peroxide and lauryl peroxide) and various thermal initiators. A preferred thermal initiator is 2,2'-azobis(isobutyronitrile), commercially available from E.I. dupont de Nemours & Co. (Wilmington, Del.) under the tradename VAZO™ 64. The initiator is present in an amount ranging from about 0.05 to about 1 part based on 100 parts total monomer content.

In carrying out the suspension polymerization of the adhesive cores, chain transfer agents, including mercaptans, alcohols and carbon tetrabromide, may be useful. In this regard, isooctyl thioglycolate and carbon tetrabromide are preferred. The chain transfer agent is present in an amount ranging from about 0.01 to about 0.5 part based on 100 parts total monomer content.

If aqueous suspension polymerization is used to prepare the adhesive cores, conventional dispersion aids, stabilizers and, optionally, anionic and nonionic surfactants may be advantageously employed. The amount of surfactant, if included, is preferably from about 2.5 parts per million to about 1.0 part by weight based on 100 parts total monomer content. Preferred surfactants include sodium lauryl sulfate and sodium dioctyl sulfosuccinate.

Dispersion aids are those conventionally used in suspension polymerization processes. Typically they are water insoluble or minimally water soluble inorganic powders such as tribasic calcium phosphate, calcium carbonate, calcium sulfate, barium sulfate, barium phosphate, hydrophilic silicas, zinc oxide and magnesium carbonate. Preferred inorganic dispersion aids include barium sulfate, hydrophilic silicas, zinc oxide and tribasic calcium phosphate.

Typical stabilizers are water soluble organic compounds, such as, for example, polyvinyl alcohol, poly-N-vinyl2-pyrrolidone, polyacrylic acid, polyacrylamide and hydroxyalkyl cellulose. Poly-N-vinyl-2-pyrrolidone and polyvinyl alcohol with a molecular weight of about 15,000 to about 630,000 are preferred. The total amount of dispersion aid and stabilizer is present in an amount ranging from about 0.01 part to about 5 parts based on 100 parts total monomer content.

Optionally, photocrosslinking agents may be used in preparing adhesive cores useful in the invention. Preferred crosslinking agents include copolymerizable aromatic ketone monomers, especially acryloxybenzophenone. When present, the photocrosslinker generally comprises from about 0.01 part to about 5 parts based on 100 parts total monomer weight.

Various additives may also be included in the monomer premix. Such additives include, for example, bases such as ammonia, tertiary amines, sodium hydroxide, barium hydroxide, calcium hydroxide, magnesium hydroxide, potassium hydroxide and lithium hydroxide. These additives comprise from about 0.1 part to about 5 parts based on 100 parts total monomer content.

The monomers, free-radical initiator, chain transfer agent, and other additives (if included) are blended in the prescribed ratio to form a monomer premix. The monomer premix is then combined with an aqueous phase comprising water, a dispersion aid, a stabilizer, any optional surfactants (all as discussed more fully hereinabove) and polymerized, with agitation, for about 1 to 10 hours at a temperature of about 45° C. to about 85° C. to give a suspension which contains the adhesive cores. The cores may be washed and separated from the water by gravity filtration. The filtered product generally comprises about 15% to 30% water. The resulting adhesive cores typically have a diameter of about 10 microns (μm) to about 3.2 millimeters and are usually pearl shaped.

Although the preparation of the pressure sensitive adhesive cores has been particularly described with respect to an aqueous suspension polymerization technique, the cores may also be prepared by granulating a bulk pressure sensitive adhesive material at low temperatures (e.g., −60° C. or below). For example, the pressure sensitive adhesive may be frozen with liquid nitrogen so as to detackify the adhesive and then ground to provide a granular matter useful as an adhesive core in the invention.

In order to provide the adhesive cores with the essentially discontinuous organic polymer coating, a polymer additive is combined with the aqueous suspension of formed adhesive cores (if the cores were formed by aqueous suspension polymerization). The polymer additive is preferably an organic thermoplastic homopolymer or an organic thermoplastic copolymer derived from a latex of the homopolymer or the copolymer (collectively referred to hereinafter at times as "an organic polymer latex") or derived from a solvent dispersion of the homopolymer or the copolymer (collectively referred to hereinafter at times as "a solvent dispersion of an organic polymer"). Alternatively, the polymer additive may be provided as a granular material. By "thermoplastic" is meant a material that is capable of being repeatedly softened by heat and hardened by cooling over a particular temperature range. "Latex" refers to an aqueous dispersion of the particular material and which is typically produced by emulsion polymerization. By "copolymer" is meant a polymeric material comprised of two or more monomers.

Figure 2:
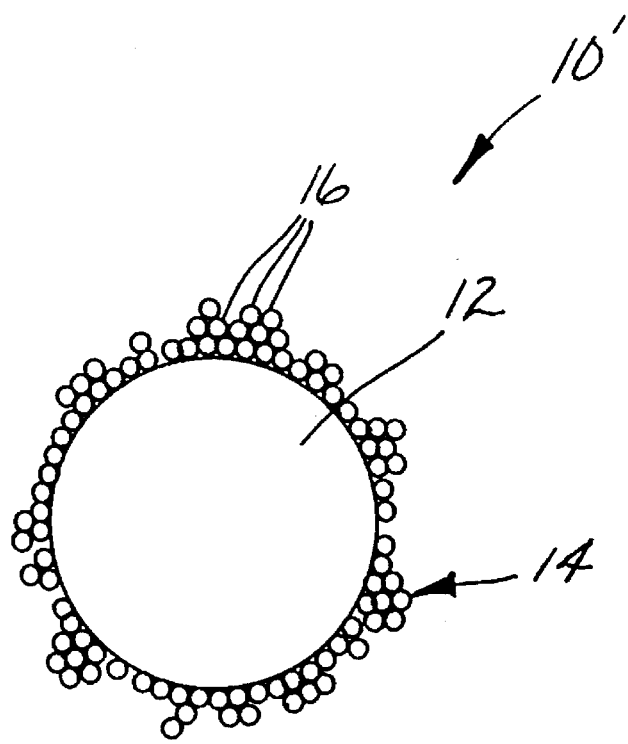
FIG. 2 is a schematic cross-sectional view of a second embodiment of an adhesive bead according to the invention.

The coating has been described as essentially discontinuous. By "essentially discontinuous" it is meant that the coating comprises a multiplicity of discrete organic polymer particles 16 (see FIGS. 1 and 2) which substantially surround the core such that the core is not substantially exposed. Typically, the particles are of substantially uniform size and shape. Organic polymer particles 16 may be provided about the core in a single layer, more than one layer, or in groups or clusters which cooperate to substantially surround the core as will be best understood by comparing FIGS. 1 and 2. By the expressions "substantially surround" and "not substantially exposed" it is recognized that gaps or spaces may exist between individual particles 16 (or clusters thereof) so long as the surface of core 12 is not exposed to a degree that beads 10 are no longer free-flowing as explained more fully hereinbelow. The essentially discontinuous coatings of the invention are to be distinguished from the essentially continuous coacervate and in situ polymerization shells of presently known adhesive beads. The presently known essentially continuous shells, while perhaps containing fissures or cracks (see FIG. 4), do not comprise a multiplicity of discrete particles which substantially surround the adhesive core.

The polymer additive comprises monomers or mixtures thereof which are polymerized by a free-radical process such as emulsion, suspension or bulk polymerization. When the polymer additive is derived from emulsion or suspension polymerization processes using redox (reduction-oxidation) or thermally activated initiators, it is provided in the form of an organic polymer latex. Preferably, the polymer additive is provided as a latex having particles with a diameter of 10 μm or less.

If desired, the latex may be dried and ground to provide the polymer additive in granular form. This granular material may be used to detackify the adhesive cores. Alternatively, the granular material can be redispersed in an appropriate organic solvent so as to provide a solvent dispersion of the organic polymer. Suitable organic solvents include low polarity alcohols such as isopropanol and n-butanol, aliphatic hydrocarbon solvents such as hexane and heptane, aromatic hydrocarbon solvents such as benzene, toluene and xylene, as well as tetrahydrofuran, methyl ethyl ketone, and the like. For most nonaqueous solvents, it will be necessary to first dry the latex before dispersing it in the solvent.

Free-radical bulk or solution polymerization requiring thermal or photochemical initiation using organic peroxides, hydroperoxides, azo or diazo compounds may also be employed. Other polymerization processes such as cationic, anionic and coordination polymerizations can also provide the polymer additive. References which discuss such processes include F. W. Billmeyer, *Textbook of Polymer Science*, 3rd ed., Wiley, Interscience 1984, pp. 85–91, and R. Morrison and R. Boyd, *Organic Chemistry*, 3rd. ed., Allyn and Bacon, 1973, pp. 1037–1039.

Cationic polymerization is preferably limited to unsaturated hydrocarbon polymer coatings such that Lewis acids, protonic acids or carbenium ions are typically used as catalysts along with low reaction temperatures (i.e., usually below room temperature). Anionic polymerization (also known as "living" polymerization) is typically initiated by strong anions derived from alkyl lithium, sodium in liquid ammonia, and the like at room temperature or below to give essentially monodisperse polymers. Coordination polymerization involves Ziegler-Natta catalysts usually employed in fluidized bed processes to give stereospecific polymers. The polymer produced by any of these methods is usually in bulk or semi-bulk form after removal of the solvent or carrier, if any was used. Granulation of the resulting product provides the polymer additive in micronized powder form.

Suitable monomers for forming either the thermoplastic homopolymer or copolymer include vinyl group and acrylate group-containing materials such as, for example, styrene, vinyl acetate, vinyl chloride, vinylidene chloride, alkyl methacrylates such as methyl methacrylate, ethyl methacrylate or butyl methacrylate and mixtures thereof. When the polymer additive is provided as a thermoplastic copolymer, the above monomers may be blended with each other and/or further mixed with a polar comonomer such as sodium styrene sulfonate, sodium acrylate, sodium methacrylate, acrylic acid, methacrylic acid, maleic acid, fumaric acid, sodium maleate, sodium fumarate, citraconic acid, vinyl betaines, N-vinyl-2-pyrrolidone, 4-vinylpyridine, acrylamides, substituted acrylamides, and mixtures thereof. Preferred polar comonomers include sodium styrene sulfonate, acrylic acid, sodium acrylate, methacrylic acid, sodium methacrylate, N-vinyl-2-pyrrolidone and acrylamide. When present, the polar comonomer comprises from about 0.5 part to about 10 parts based on 100 parts total monomer content of the organic copolymer coating.

Both the adhesive cores and the organic polymer coatings made by the processes of the invention may contain one or more adjuvants. Preferred adjuvants include tackifiers, plasticizers, pigments, dyes, extenders, fillers, antioxidants, multifunctional cross-linkers, and other stabilizers. Another useful class of additives is ferromagnetic materials (which may be magnetized or not) such as iron, cobalt, nickel, gadolinium and dysprosium and salts and alloys thereof, including alloys of these metals with other elemental materials such as chromium, manganese, carbon, silicon, aluminum, copper, titanium, barium, strontium, tungsten, vanadium, niobium, platinum, and silver. An especially preferred additive is bis-vinyl ether. When present, this additive generally comprises from about 0.5 to about 1.0 part based on 100 parts total adhesive core monomer content. Another preferred group of additives are those which will increase the cohesive strength of the bead core, e.g., ammonia or tertiary amines.

Preferably, the thermoplastic homopolymer or copolymer for the coating has a glass transition temperature (Tg) of at least about 25° C., more preferably from 90° to 95° C. while the adhesive core preferably has a Tg below about 20° C. If the Tg of the homopolymer or copolymer is less than about 25° C., it may be too close to the Tg of the adhesive core material and, as a result, may blend therewith and materially adversely affect the free-flowing quality of the adhesive beads of the invention.

As explained more fully below, the polymer additive, whether provided as an organic polymer latex, a solvent dispersion of an organic polymer, or as a powder, may be combined with the inherently tacky adhesive cores by several different techniques so as to form adhesive beads according to the invention. In each instance, the polymer additive is preferably provided in an amount ranging from about 1 part to about 5 parts per 100 parts by weight of adhesive cores, more preferably from about 2 parts to about 3 parts.

In one technique an organic polymer latex derived by emulsion polymerization may be combined with previously formed and filtered adhesive cores and then agitated so as to provide the adhesive cores with an essentially discontinuous organic polymer coating derived from the latex. Alternatively, in situ emulsion polymerization may be employed. In this approach, the ingredients which provide the coating are blended together and emulsion polymerized in the presence of the previously formed adhesive cores. In a third technique, the ingredients which provide the coating may be added to the adhesive core monomer premix after the exotherm which occurs during the suspension polymerization thereof. The coating materials may then be emulsion polymerized. As a fourth alternative, an organic polymer latex for forming the coating may be combined with the adhesive core monomer premix prior to the suspension polymerization of the cores. Such an approach may be regarded as an "in-line" process. In a fifth approach, an organic polymer latex for the coating may be dried and ground to a fine granular state. The granular coating may then be applied to previously formed adhesive cores such as by dusting the cores with granular coating material or rolling the cores in the granular coating material. Each of the above described techniques result in the formation of adhesive beads having the structures shown in FIGS. 1 and 2.

Once the basic bead structure comprising a pressure sensitive adhesive core and a discontinuous organic polymer coating has been formed, the suspension of formed beads (if there is a suspension) may be dried so as to convert the beads to an essentially moisture-free condition. By "essentially moisture-free" it is meant that the beads contain no more than about 5% moisture. Any of a variety of conventionally used drying methods such as, for example, freeze drying, heated air flash drying, spray drying, fluidized bed drying or column drying may be employed. Spray drying is a particularly preferred technique. The beads may be filtered prior to drying using, for example, a bulk dewatering process such as a belt conveyer.

Once dried, adhesive beads according to the invention are nonagglomerating, essentially cluster-free and free-flowing. These terms are used interchangeably and are defined with reference to a modified version of ASTM D-1895-69 but with a funnel discharge time of less than 1 minute. More particularly, a static free funnel having a volume of about 100 milliliters (ml) and a discharge spout inside diameter of about 12.7 millimeters (mm) is employed. The discharge spout is temporarily closed by placing a static free object such as a wood tongue depressor against the distal end thereof and approximately 20 grams (g) of adhesive beads are lightly poured into the funnel so as to avoid any packing thereof. The flat strip of wood is removed and the elapsed time before the last bead discharges from the funnel is recorded as the funnel discharge time.

This test method recognizes that small clusters or clumps of beads are permissible within the scope of the invention so long as the clusters or clumps do not impede movement of the beads through the funnel to the extent that the funnel discharge time exceeds 1 minute. The essentially discontinuous organic polymer coating renders the beads nontacky to the touch and contributes to their free-flowing nature.

Interestingly, adhesive beads according to the invention are electrostatically chargeable. More particularly, when adhesive beads according to the invention are placed in a polystyrene petri dish, covered with a nonconductive fiber board material, and shaken vigorously by hand for about 30 seconds, they display a static charge in the presence of a noncontact electrostatic voltmeter. Furthermore, the adhesive beads of the invention can be rendered magnetically responsive by including a ferromagnetic additive such as described above. By "magnetically responsive" it is meant that the beads are attracted and cling to a permanent magnet placed among the beads or are themselves permanent magents.

Adhesive beads according to the invention are useful in any application in which a pressure sensitive adhesive would have utility. Preferably, the beads are applied to a substrate by coating or extruding them as a 100% solids system. During or subsequent to the application of the adhesive beads in a dry powder form to a substrate, the beads are easily activated by heat and/or pressure to expose the adhesive cores. When the beads are in a dry, free-flowing condition, the core and the coating may be regarded as non-compatible in the sense that the core and the coating are not miscible with each other at room temperature (about 20° to 22° C.). However, upon the application of heat, the adhesive cores and coatings melt and form a compatible adhesive melt-blend with each other. Upon the application of pressure, the coating material is displaced and the exposed cores cold flow to form a blend. With the application of both heat and pressure, lower levels of each are required.

Extrusion coating yields the highest level of melt-blending and maximum adhesion. In all cases, the coating is not detrimental to the adhesive characteristics of the beads.

By "compatible" and "melt blend" it is meant that after activation, a phase separation between the core and the coating is not visible to the unaided human eye.

Adhesive beads according to the invention may be extruded using conventional, commercially available polymer extrusion or hot-melt composition applicator systems that employ an increasing temperature profile which begins at least at about 65° C. and progresses to a maximum of about 235° C., more preferably from about 120° C. to about 205° C. The melt flow may then be channeled to a film or sheet forming die having an orifice of at least about 0.025 mm so that the melt may be applied to or deposited on the substrate to be coated. Useful extrusion processes such as the one described above are explained more fully in *Polymer Extrusion* by C. Rauwendaal, Hanser Publishers, New York, N.Y., 1986.

Alternatively, adhesive beads according to the invention may be coated as an aqueous or solvent dispersion using knife coating, bar coating and rotogravure techniques, for example. Once coated, the adhesive beads may be dried and then subsequently activated by the application of heat and/or pressure by, for example, calendaring or passing the adhesive simultaneously dried and heat activated with a variety of heating systems of either the direct or indirect type.

In another approach, adhesive beads according to the invention, when supplied as a dry powder, may be dusted onto a substrate that has been pretreated so as to facilitate the adhesion of the beads thereto. The adhesive beads may then be activated by passing the coated substrate between a pair of heated nip rollers or the like.

Conventional pressure sensitive adhesives that are 100% solids formulations are packaged in drums, pails or cartons. Because of the tacky nature of the adhesives, release liners or special unloaders must be employed to evacuate the adhesive from its packaging. Adhesive beads according to the invention function as a conventional pressure sensitive adhesive but are free from these packaging disabilities because the beads are free-flowing. Consequently, the beads may be readily supplied to an extruder or a hopper feeder without packing or agglomerating.

The invention will be more fully appreciated with reference to the following nonlimiting examples in which all parts are parts by weight unless indicated otherwise. The examples employ materials which are identified by abbreviations according to the schedule shown below:

| Abbreviation | Material |
|---|---|
| AA | Acrylic acid |
| ACM | Acrylamide |
| CBr$_4$ | Carbon tetrabromide |
| IOA | Isooctyl acrylate |
| IOTG | Isooctyl thioglycolate |
| IPA | Isopropyl alcohol |
| K$_2$S$_2$O$_8$ | Potassium persulfate |
| LiOH | Lithium hydroxide |
| MAA | Methacrylic acid |
| MMA | Methyl methacrylate |
| NaLS | Sodium lauryl sulfate |
| NaHSO$_3$ | Sodium bisulfite |
| NH$_4$OH | Ammonium hydroxide |
| NVP | N-vinyl-2-pyrrolidone |
| PMMA | Poly(methyl methacrylate) |
| PNVP | Poly(N-vinyl-2-pyrrolidone) |
| PS | Polystyrene |
| S | Styrene |
| SSS | Sodium styrene sulfonate |
| THF | Tetrahydrofuran |
| VAZO ™ 64* | 2,2'-azobis(2-methylpropionitrile) |
| VOAc | Vinyl acetate |
| ZnO | Zinc oxide |

*Commercially available under this tradename from E.I. duPont de Nemours & Co., Wilmington, Delaware.

EXAMPLE 1

Example 1 describes the preparation of pressure sensitive adhesive cores based on acrylic acid esters and using an aqueous suspension polymerization technique.

A reaction was carried out in a five liter split flask equipped with a condenser, a motor driven stainless steel stirrer having a speed control, a thermowell, a nitrogen gas inlet, and heating lamps with a temperature control. A dispersion of 7.8 g of ZnO and 1.56 g of PNVP in 1820 g of deionized water was added to the flask, the temperature was maintained at 58° C., and the agitator (stirrer) was set at 375 revolutions per minute (rpm). A degassed monomer premix comprising 5.2 g of MMA, 260 g of VOAc, 64.5 g of MAA, 1232.4 g of IOA, 0.8324 g of IOTG, and 7.8 g of VAZO™ 64 was then added to the flask, followed by 3.9 g of NH$_4$OH. An exotherm was observed during which time the temperature was maintained at about 68° C. with an ice-water bath. After 1.5 hours, the temperature was reduced to 65° C. and the agitation increased to 425 rpm. After 5.5 hours the temperature was decreased to 50° C. and 3.12 g of LiOH in 40 mililiters (ml) of deionized water was added to the reaction flask. Agitation at 425 rpm was continued for 0.5 hour. The resulting copolymer adhesive cores were dewatered and filtered. Upon subsequent drying, the cores were inherently tacky and were not free-flowing as defined by the funnel discharge time test (ASTM D-1895-69) explained above.

EXAMPLE 2

Example 2 describes the preparation of a polymer additive derived from an organic polymer latex. The polymer additive was subsequently used to form an essentially discontinuous organic polymer coating about the adhesive cores of example 1. In general, conventional emulsion polymerization techniques may be employed to form the organic polymer latex.

More particularly, a reaction was carried out in a two liter split flask equipped with a condenser, a motor driven stainless steel stirrer (agitator) having a speed control, a thermowell, heating lamps with a temperature control, and a nitrogen gas inlet. An aqueous dispersion comprising 10.0 g of PNVP, 297.0 g of MMA, and 3.0 g of SSS in 1000 g of degassed, deionized water was heated to 55° C. with agitation at 250 rpm. The flask was then charged with 0.60 g of K$_2$S$_2$O$_8$ and the reaction was allowed to proceed for four hours at 55° C. The reaction mixture was then cooled to room temperature (about 20° to 22° C.) at which time a trace amount (about 0.01 g) of hydroquinone was added to remove any residual initiator. The reaction provided an organic polymer latex of a polymer additive comprising 99 parts MMA and 1 part SSS.

54.8 g of the organic polymer latex were added to 450 g of filtered adhesive cores prepared according to example 1, which was an amount equivalent to 4% of the adhesive cores on a dry weight basis. The mixture of previously formed adhesive cores and organic polymer latex was heated in a two liter reaction flask to 65° C. with agitation and maintained at that temperature for about 30 minutes. The resulting adhesive beads were filtered and dried with constant agitation under ambient conditions.

The beads had substantially the structure illustrated in FIG. 1 with an essentially discontinuous organic polymer coating comprising 99 parts MMA and 1 part SSS. The beads had a moisture content of less than 1%. The pourability of the beads was determined according to the modified version of ASTM D-1895-69 described above. The peel adhesion and shear holding strength of the adhesive formulation provided by these beads were also measured as described more fully below. The results of these tests are reported in Table 1.

Figure 3:
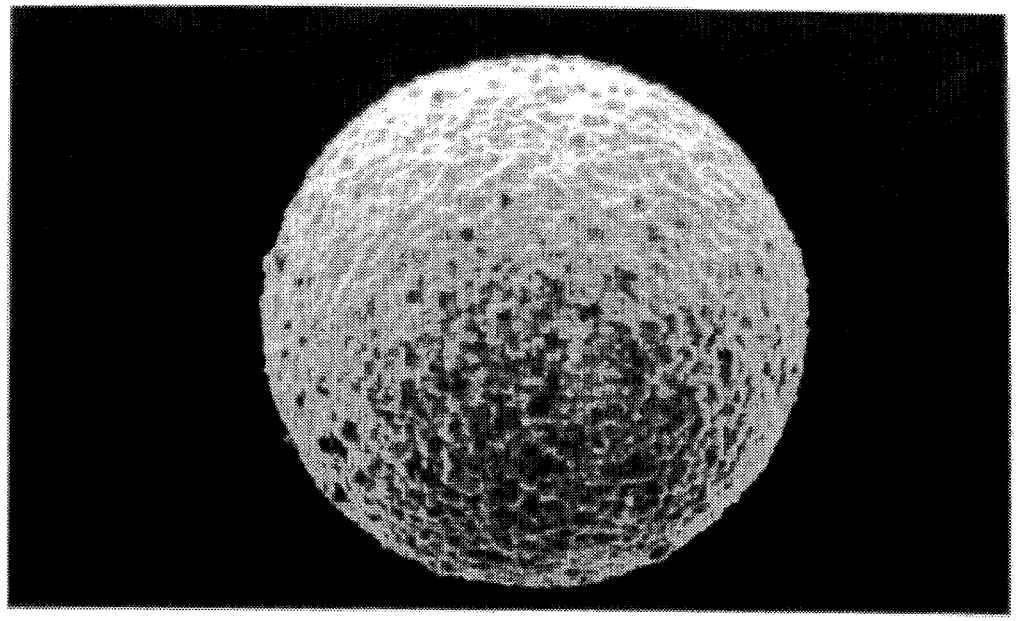
FIG. 3 is a photomicrograph (enlarged 250 times) of an adhesive bead according to the invention.

Photomicroscopy indicated that the beads of this example comprised a core surrounded by an essentially discontinuous coating of discrete organic polymer particles as shown in the photomicrograph of FIG. 3.

EXAMPLE 3

An organic polymer latex was prepared using emulsion polymerization according to example 2 except that the two liter flask was charged with 333 g of degassed and deionized water, 3.33 g of PNVP, and 100 g of MMA. Once the temperature reached 55° C., 0.202 g of $K_2S_2O_8$ and 0.145 g of $NaHSO_3$ were charged to the reaction flask and the reaction was allowed to proceed for four hours at 55° C. Analysis by gel permeation chromatography indicated that the high molecular weight PMMA homopolymer latex formed in this example had a weight average molecular weight of 806,000 and a polydispersity of 3.3.

54.8 g of the high molecular weight PMMA homopolymer latex were added to 450 g of the filtered adhesive cores of example 1 as described in conjunction with example 2, thereby forming dry adhesive beads which included an essentially discontinuous organic polymer coating derived from a high molecular weight PMMA homopolymer. Testing of the beads is reported in Table 1.

EXAMPLE 4

An organic polymer latex was prepared by emulsion polymerization according to example 2 except that the two liter flask was charged with 10 g of PNVP, 1000 g of degassed and deionized water, 300 g of MMA, and 0.1620 g of $CBr_4$. Once the temperature reached 55° C., 0.60 g of $K_2S_2O_8$ and 0.40 g of $NaHSO_3$ were added to the reaction flask and the reaction was allowed to proceed for four hours at 55° C. After four hours at 55° C., 0.05 g of hydroquinone was added to deactivate any excess initiator. Analysis by gel permeation chromatography indicated that the low molecular weight PMMA homopolymer latex formed in this example had a weight average molecular weight of 687,000 and a polydispersity of 3.0.

54.8 g of the low molecular weight PMMA homopolymer latex were added to 450 g of the filtered adhesive cores of example 1 as described in conjunction with example 2 thereby forming dry adhesive beads which included an essentially discontinuous organic polymer coating derived from a low molecular weight PMMA homopolymer. Testing of the beads is reported in Table 1.

EXAMPLE 5

An organic polymer latex was prepared by emulsion polymerization according to example 2 except that the two liter flask was charged with 5.0 g of NaLS, 145.5 g of MMA, 4.5 g of AA, and 500 g of degassed and deionized water. Once the temperature reached 55° C., 0.30 g of $K_2S_2O_8$ was charged to the reaction flask and the reaction was allowed to proceed for four hours at 55° C. After this time, the reaction mixture was allowed to cool to room temperature and about 0.01 g of hydroquinone was added to remove any residual initiator. The resulting organic polymer latex comprised 97 parts MMA and 3 parts AA. 54.8 g of the latex were added to 450 g of the filtered adhesive cores of example 1 as described in conjunction with example 2 thereby forming dry adhesive beads which included an essentially discontinuous organic polymer coating comprising 97 parts MMA and 3 parts AA. Testing of the beads is reported in Table 1.

EXAMPLE 6

An organic polymer latex was prepared by emulsion polymerization according to example 5 except that the amount of MMA was reduced to 142.5 g and 7.5 g of NVP was substituted for the AA. The mixture was reacted as described in conjunction with example 5. 54.8 g of the resulting latex were added to 450 g of the filtered adhesive cores of example 1 as described in conjunction with examples 2 and 5, thereby forming dry adhesive beads which included an essentially discontinuous organic polymer coating comprising 95 parts MMA and 5 parts NVP. Testing of the beads is reported in Table 1.

EXAMPLE 7

An organic polymer latex was prepared by emulsion polymerization according to example 5 except that 4.5 g of ACM was substituted for the AA of example 5. The mixture was reacted as described in conjunction with example 5 and 54.8 g of the resulting latex were added to 450 g of the filtered adhesive cores of example 1 (following the procedure of example 2), thereby dry forming adhesive beads which included an essentially discontinuous organic polymer coating comprising 97 parts MMA and 3 parts ACM. Testing of the beads is reported in Table 1.

EXAMPLE 8

An organic polymer latex was prepared by emulsion polymerization according to example 2 except that the two liter flask was charged with 2.5 g of NaLS, 100 g of S, and 297 g of degassed and deionized water. Once the temperature reached 55° C., 0.30 g of $K_2S_2O_8$ was added to the reaction flask and the reaction was allowed to proceed for four hours at that temperature. After four hours, the reaction mixture was allowed to cool to room temperature and 0.01 g of hydroquinone was added to remove any residual initiator. Analysis by gel permeation chromatography indicated that the high molecular weight PS homopolymer latex formed in this example had a weight average molecular weight of 1,650,000 and a polydispersity of 3.8. 37.0 g of the high molecular weight PS homopolymer latex were added to 450 g of the filtered adhesive cores of example 1 and reacted as described in conjunction with example 2, thereby forming dry adhesive beads which included an essentially discontinuous organic polymer coating derived from a high molecular weight PS homopolymer. Testing of the beads is reported in Table 1.

EXAMPLE 9

An organic polymer latex was prepared by emulsion polymerization according to example 2 except that the two liter flask was charged with 10.0 g of NaLS, 0.132 g of $CBr_4$, 300 g of S, and 1,000 g of degassed and deionized water. Once the temperature reached 55° C., 0.61 g of $K_2S_2O_8$ was added and the reaction was allowed to proceed at this temperature for 4.5 hours. At this time, the reaction mixture was allowed to cool to room temperature and 0.01 g of hydroquinone was added to remove any residual initiator. Analysis by gel permeation chromatography indicated that the low molecular weight PS homopolymer latex formed in this example had a weight average molecular weight 585,000 and a polydispersity of 2.4.

54.8 g of the low molecular weight PS homopolymer latex were added to 450 g of the filtered adhesive cores of example 1 as described in conjunction with example 2, thereby forming dry adhesive beads which included an essentially discontinuous organic polymer coating derived from a low molecular weight PS homopolymer. Testing of the beads is reported in Table 1.

EXAMPLE 10

An organic polymer latex was prepared by emulsion polymerization according to example 2 except that the two liter flask was charged with 10.0 g of PNVP, 192.0 g of S, 8.0 g of SSS, and 666 g of degassed and deionized water. Once the temperature reached 55° C., 0.40 g of $K_2S_2O_8$ was added and the reaction was allowed to proceed at 55° C. for four hours. After that time, the reaction mixture was allowed to cool to room temperature and 0.01 g of hydroquinone was added to remove any residual initiator.

54.8 g of the resulting organic polymer latex were added to 450 g of the filtered adhesive cores of example 1 as described in conjunction with example 2 thereby forming dry adhesive beads which included an essentially discontinuous organic polymer coating comprising 96 parts S and 4 parts SSS. Testing of the beads is reported in Table 1.

EXAMPLE 11

An organic polymer latex was prepared by emulsion polymerization according to example 2 except that the two liter flask was charged with 10.0 g of PNVP, 285.0 g of S, 15.0 g of NVP, and 1,002 g of degassed and deionized water. Once the temperature reached 55° C., 0.60 g of $K_2S_2O_8$ was added to the reaction flask and the reaction was allowed to proceed for four hours at that temperature. At that time, the reaction mixture was allowed to cool to room temperature and 0.01 g of hydroquinone was added to remove any residual initiator.

54.8 g of the resulting organic polymer latex were added to 450 g of the filtered adhesive cores of example 1 as described in conjunction with example 2, thereby forming dry adhesive beads which included an essentially discontinuous organic polymer coating comprising 95 parts S and 5 parts NVP. Testing of the beads is reported in Table 1.

EXAMPLE 12

Example 12 illustrates the formation of adhesive beads comprising inherently tacky pressure sensitive adhesive cores surrounded by an essentially discontinuous organic polymer coating that comprises 99 parts MMA and 1 part SSS. The organic polymer for the coating was provided in the form of a latex which was derived from an emulsion polymerization that was carried out in the presence of previously formed adhesive cores. Thus, example 12 illustrates the formation of an essentially discontinuous organic polymer coating derived from in situ emulsion polymerization.

More specifically, a reaction apparatus comprising a two liter split flask equipped with a condenser, a stainless steel motor driven stirrer (agitator) having a speed control, a thermowell, a heating mantel with a temperature control, and a nitrogen gas inlet was erected. The reaction flask was charged with 318 g of the filtered adhesive cores of example 1, 0.3 g of PNVP, and 350 of degassed and deionized water. The mixture was heated to 55° C. with agitation at which time 0.05 g of $K_2S_2O_8$ was added.

A polymer additive for forming the coating was prepared by mixing together 11.9 g of MMA and 0.1 g of SSS dissolved in 10 g of degassed and deionized water. The polymer additive was added to the reaction flask with agitation and at a rate of approximately 2 milliliters per hour. The emulsion polymerization reaction was allowed to proceed for approximately five hours at 55° C. The resulting beads were collected, filtered and dried with constant agitation in a fume hood under ambient conditions. Testing of the beads is reported in Table 1.

EXAMPLE 13

This example describes the preparation of adhesive beads according to the invention wherein the coating is provided by a latex dispersion of the polymer additive that is added to the adhesive cores shortly after the observation of the exotherm which occurs during the aqueous suspension polymerization of the cores.

More particularly, a reaction was carried out in a two liter split flask equipped with a condenser, a motor driven stainless steel stirrer (agitator) having a speed control, a thermowell, heating lamps with a temperature control, and a nitrogen gas inlet. A dispersion of 1.5 g of ZnO and 0.3 g of PNVP in 350 g of deionized water was added to the flask and the temperature was maintained at 58° C. with agitation at 375 rpm. A degassed monomer premix for forming the cores and comprising 1.0 g of MMA, 50 g of VOAc, 12.4 g of MAA, 237 g of IOA, 0.1606 g of IOTG, and 1.5 g of VAZO™ 64 was added, followed by 0.75 g of $NH_4OH$. After the exotherm was observed (about one hour after the start of the reaction), 53.2 g of the organic polymer latex of example 2 was added. After 1.5 hours, the temperature was increased to 65° C. with constant agitation at 375 rpm. After five hours, the temperature was decreased to 50° C., and 0.16 g of LiOH in 10 ml of deionized water was added to the reaction mixture. Agitation at 375 rpm was continued for 0.5 hour.

The resulting adhesive beads were filtered and dried under constant agitation at ambient conditions. The beads comprised a pressure sensitive adhesive core surrounded by an essentially discontinuous organic polymer coating comprising 99 parts MMA and 1 part SSS. Testing of the beads is reported in Table 1.

EXAMPLE 14

The procedure of example 13 was repeated except that the organic polymer latex of example 2 was combined with the monomer premix for forming the adhesive cores prior to the initiation of the suspension polymerization that formed the cores. The resulting dry beads comprised a pressure sensitive adhesive core surrounded by an essentially discontinuous organic polymer coating comprising 99 parts MMA and 1 part SSS. This example demonstrates adhesive beads according to the invention may be formed using an "in-line" process. Testing of the beads is reported in Table 1.

EXAMPLE 15

Example 15 illustrates that the polymer additive for forming the essentially discontinuous organic polymer coating may be provided as a granulated material rather than as an organic polymer latex as used in examples 2–14. More specifically, the organic polymer latex of example 2 was dried in an oven maintained at 65° C. for 15 hours and subsequently pulverized so as to form a dry, granular material having an average particle size of less than about 1 μm in diameter. 12.6 g of the granular material were combined with 450 g of the filtered adhesive cores of example 1 and 450 g of deionized water in a two liter reaction flask. The mixture was heated to 65° C. with agitation and maintained at this temperature for approximately 30 minutes. The resulting beads were filtered and dried with continuous agitation in a fume hood under ambient conditions and comprised a pressure sensitive adhesive core surrounded by an essentially discontinuous organic polymer coating comprising 99 parts MMA and 1 part SSS. Testing of the beads is reported in Table 1.

EXAMPLE 16

Example 16 illustrates that an essentially discontinuous organic polymer shell according to the invention may be derived from a solvent dispersion of an appropriate homopolymer or copolymer (i.e., a solvent dispersion of an organic polymer). More specifically, 55.8 g of the MMA/SSS copolymer latex formed in example 2 was dispersed in 120 g of IPA, which dispersion was mixed with 450 g of the filtered adhesive cores of example 1 and 450 g of deionized water. The mixture was heated to 65° C. with agitation for 30 minutes. The resulting beads were then filtered and dried with constant agitation in a fume hood under ambient conditions. The resulting beads comprised a pressure sensitive adhesive core surrounded by an essentially discontinuous organic polymer coating comprising 99 parts MMA and 1 part SSS. Testing of the beads is reported in Table 1.

The adhesive beads of examples 1 to 16 were tested for pourability, peel adhesion and shear holding strength as reported in Table 1. The pourability of the beads was determined according to the modified version of ASTM D-1895-69 described above.

TEST PROCEDURES

Peel adhesion and shear holding strength were determined by forming tapes comprising polyester film with the adhesive beads of examples 1 to 16 coated thereon. More particularly, tape samples were prepared by extrusion coating a 38 μm thick layer of the adhesive beads of examples 1 to 16 onto a 23 μm thick aluminum vapor coated polyester film with a 0.75 inch (1.9 centimeters (cm)) HAAKE 3-zone, 25:1 length:diameter ratio extruder (commercially available from Haake Buchler Instruments, Inc., Saddle Brook, N.J.) fitted with a 25.4 μm orifice coating die. Temperature control was not used in zone 1 of the extruder. Zone 2 was set at 350° F. (177° C.), zone 3 was set at 375° F. (199° C.), and the die orifice was set at 425° F. (218° C.). Once the adhesive beads were extrusion coated onto the polyester film, the film was cut into 0.50 inch (1.25 cm) wide strips.

Peel adhesion was determined according to ASTM P3330-78 and is regarded as the force required to remove an adhesive coated flexible sheet material from a test panel measured at a specific angle and rate of removal. This test represents the maximum adhesion which may be expected. In the examples the force is expressed in Newtons per 100 millimeters width of coated sheet (N/100 mm). The procedure was as follows:

1. A 12.5 mm wide adhesive coated polyester film strip was applied to the horizontal surface of a clean glass test plate with at least 12.7 lineal cm in firm contact with the plate. A hard rubber roller was used to apply the strip.
2. A free end of the film strip was doubled back nearly touching itself so that the angle of removal would be 180°. The free end was attached to the adhesion tester scale.
3. The glass test plate was clamped in the jaws of a tensile testing machine which was capable of moving the plate away from the scale at a constant rate of 2.3 meters per minute.
4. The scale reading in Newtons was recorded as the tape was peeled from the glass surface. The data were recorded as the average value of the range of numbers observed during the test.

Shear holding strength was determined according to ASTM D3654-78 and is a measure of the cohesiveness or internal strength of an adhesive. It is based upon the amount of force required to pull an adhesive coated flexible sheet material from a standard flat surface in a direction parallel to the surface to which it has been affixed with a definite pressure. It is measured in terms of time (minutes) required to pull a standard area of adhesive coated sheet material from a stainless steel test panel under the stress of a constant load.

The shear holding strength test was conducted on adhesive coated polyester film strips that had been applied to a stainless steel panel such that a 12.5 mm by 12.5 mm portion of each strip was in firm contact with the panel. One end of the tape remained free. The panel with coated strip attached thereto was mounted in a rack such that the panel formed an angle of 178° with the extended tape free end which was then tensioned by application of a force of one kilogram applied as a hanging weight from the free end of the strip. The 2° less than 180° was used to negate any peel forces thus insuring that only shear forces were measured. The time for each tape sample to separate from the test panel was recorded as a measure of the shear strength.

TABLE I

| Example Number | Peel Adhesion (N/100 mm) | Shear Holding Strength (min.) | Pourability (sec.) |
| --- | --- | --- | --- |
| 1 | 44 | 727 | Not pourable |
| 2 | 33 | 525 | 3.5 |
| 3 | 35 | 647 | 2.0 |
| 4 | 33 | 576 | 5.5 |
| 5 | 37 | 661 | 6.0 |
| 6 | 35 | 623 | 7.2 |
| 7 | 35 | 373 | 5.0 |
| 8 | 35 | 702 | 2.0 |
| 9 | 31 | 583 | 3.5 |
| 10 | 33 | 456 | 6.5 |
| 11 | 39 | 479 | 5.5 |
| 12 | 34 | 538 | 5.5 |
| 13 | 35 | 623 | 5.6 |
| 14 | 39 | 502 | 6.0 |
| 15 | 39 | 674 | 1.8 |
| 16 | 35 | 619 | 6.5 |

Example 1 reflects the performance of bare adhesive cores (i.e., adhesive cores which have not been provided with a coating). Examples 2 to 16 describe the performance of adhesive beads according to the invention. The peel adhesion and shear holding strength of examples 2 to 16 relative to example 1, though reduced, are entirely within useful ranges for conventional pressure sensitive adhesive applications. Significantly, the adhesive beads of examples 2 to 16 are pourable (free-flowing) at room temperature because they include a nontacky, essentially discontinuous organic polymer coating. The bare adhesive cores of example 1 were not free-flowing. Consequently, whereas the adhesive beads of examples 2 to 16 may be readily supplied to an extruder from a hopper feeder, the bare adhesive cores of example 1 cannot.

EXAMPLE 17

Adhesive cores according to the invention were formed in a reaction carried out in a two liter split flask equipped with a condenser, a motor driven stainless steel stirrer (agitator) having a speed control, a thermowell, heating lamps with a temperature control, and a nitrogen gas inlet. A dispersion of 1.5 g of ZnO, 0.3 g of PNVP, and 350 g of degassed and deionized water was added to the flask and the temperature was maintained at 58° C. with agitation at 375 rpm. A degassed monomer premix for forming the adhesives cores and comprising 1.0 g of MMA, 50 g of VOAc, 12.3 g of MAA, 237 g of IOA, 0.1804 g of IOTG, and 1.5 g of VAZO™ 64 was added followed by 0.75 g NH₄OH. No temperature rise was observed during the exotherm (about one hour after the start of the reaction). After 1.5 hours, the temperature was increased to 65° C. and the agitation was increased to 425 rpm. This temperature and agitation were maintained for about 3.5 hours at which time the reaction mixture was gravity filtered so as to isolate a 70% solids mixture of the adhesive cores. With the exception of some slight variations in composition, the adhesive cores of this example are substantially identical to the adhesive cores of example 1.

54.8 grams of the low molecular weight PMMA homopolymer latex of example 4 were added to 450 g of the filtered adhesive cores of this example as described in conjunction with example 2 thereby forming dry adhesive beads which included an essentially discontinuous organic polymer coating derived from a low molecular weight PMMA homopolymer.

Comparative Example 1

Comparative example 1 illustrates the formation of adhesive beads comprising a pressure sensitive adhesive core surrounded by an essentially discontinuous inorganic powder coating. More particularly, a dispersion comprising 450 g of filtered adhesive cores made like in example 17 and 450 g of deionized water was mixed with 12.6 g of AEROSIL™ R972 hydrophobic fumed silica (commercially available from Degussa Corp., Ridgefield Park, N.J.) dispersed in 27 g of IPA. The resulting mixture was heated at 65° C. with agitation for 30 minutes. The resulting beads were filtered and dried with constant agitation in a fume hood under ambient conditions. The resulting beads were free-flowing and had a moisture content of less than 1%. The pourability and shear holding strength of the adhesive beads of comparative example 1 were similar to that obtained for examples 2 to 16 above. Additional testing of the beads of this example is reported in Table 2. An attempt to spray dry the adhesive beads of this example using a three foot (91.4 cm) diameter spray dryer (Niro Inc., Columbia, Md.) with an inlet temperature of 135° C. was unsuccessful. The silica powder coating separated from the adhesive cores and passed through the drying apparatus while the adhesive cores agglomerated and coated the interior walls of the apparatus.

Comparative Example 2

Comparative example 2 describes the formation of adhesive beads comprising pressure sensitive adhesive cores surrounded by continuous urea-formaldehyde shells. More particularly, a precondensate of the shell material was prepared by mixing 48 g of urea and 121 g of 37% formalin and a sufficient amount of 10% sodium hydroxide to adjust the solution pH to 8.0. The mixture was agitated at 70° C. for one hour. 28 g of the precondensate were added to a dispersion comprising 403 g of filtered adhesive cores made like in example 17 and 500 g of deionized water. A sufficient amount of 5% hydrochloric acid was added dropwise until the solution pH was 3.5. The resulting solution was agitated at 50° C. for about five hours. This procedure was repeated until 103 g of the precondensate had been consumed in the formation of adhesive beads. Although the adhesive beads of comparative example 2 were pourable, they had a shear holding strength that was reduced by approximately one order of magnitude relative to the adhesive beads of examples 2 to 16 above. Additional testing of these beads is reported in Table 2.

Figure 4:
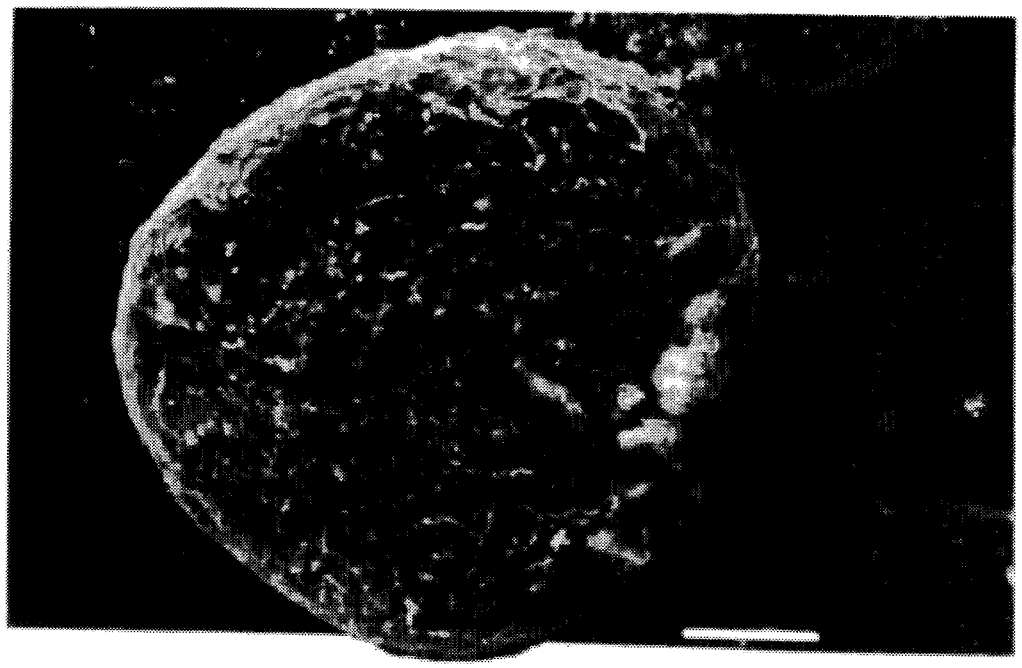
FIG. 4 is a photomicrograph (enlarged 150 times) of a presently known adhesive bead.

Photomicroscopy of the beads of comparative example 2 showed a core surrounded by an essentially continuous shell although cracks or fissures were evident in the same. Photomicroscopy did not reveal an essentially discontinuous coating or a multiplicity of discrete particles which provided an essentially discontinuous coating about a core. A representative photomicrograph of the adhesive beads of comparative example 2 is shown in FIG. 4.

Comparative Example 3

Comparative example 3 describes the formation of adhesive beads comprising pressure sensitive cores surrounded by an essentially discontinuous organic rosin ester powder coating. More particularly, a dispersion of filtered adhesive cores made like in example 17 and FORAL 85 55 WK (commercially available from Hercules, Inc., Wilmington, Del.) at a 4% loading, dry weight basis with regard to the adhesive cores, was agitated at about 400 rpm and 65° C. for two hours. The resulting beads were filtered and dried with constant agitation in a fume hood under ambient conditions. The resulting beads agglomerated and were not free-flowing when tested according to the modified version of ASTM D-1895-69 described above.

The adhesive beads of example 17 and comparative examples 1 and 2 were tested for adhesion according to the following procedure. (The adhesive beads of comparative example 3 were not tested since they were not free-flowing.) Standard, 20 pound bond white copier paper was coated with an orange printing ink (Sinclair and Valentine #88318 St. Paul, Minn.) at a weight of 5.37 g/m² using a 2.5 inch (6.35 cm) rubber roller. The ink facilitated positioning and visualization of the subsequently applied beads while maintaining the beads on the paper during post treatment. While the ink was still slightly wet, it was dusted with the previously dried, adhesive beads of examples 17 and comparative examples 1 and 2. Excess adhesive beads were lightly shaken from the paper so as to provide a monolayer coating of beads thereon (approximately 139 g/m²). The adhesive bead coated paper was air dried and cut into four equally sized samples. The adhesive coatings were then heat activated with a 4"×3" (20 cm×7.6 cm), 2 kilogram heated plate assembly by exposing the coated paper samples to a temperature of 149° C. under a constant pressure of 25.8 g/cm² for various times ("Dwell Time") as indicated below in Table 2.

Adhesion of the adhesive beads to polyester film was determined according to a modified version of ASTM P3330-78, Method C. More particularly, a strip of double faced adhesive tape (Scotch™ brand #410 double coated paper tape, commercially available from 3M Company, St. Paul, Minn.) was applied to the steel panel of a 90 Degree Peel Jig (Chemsultants, Mentos, Ohio). The adhesive coated paper samples of example 17 and comparative examples 1 and 2 were applied to the double faced tape with the adhesive bearing surface of the paper substrate facing outwardly. A 1.25 inch (3.2 cm) wide by 0.9 mil (0.2 mm) thick polyester film was applied to the adhesive coated surface of the paper with two passes of a roller. One end of the polyester film was placed in the upper jaw of the tensile tester and was pulled at a 90° angle relative to the steel plate and at the rate specified in ASTM test method. The adhesion value in grams per centimeter of width (g/cm width) is reported as the average of two samples.

TABLE 2

| Dwell Time (Minutes) | Peel Adhesion (g/cm width) | | |
|---|---|---|---|
| | Ex. 17 | Comp. Ex. 1 | Comp. Ex. 2 |
| 0.5 | 83.8 | 1.0 | 8.4 |
| 1.0 | 114.6 | 2.2 | 11.7 |
| 3.0 | 130.8 | 4.1 | 26.8 |
| 10.0 | 256.9 | 35.2 | 41.3 |

Comparative examples ("Comp. Ex.") 1 and 2, as compared to example 17, indicate that adhesive beads comprising a pressure sensitive adhesive core with either a discontinuous inorganic powder coating (comparative example 1) or a continuous urea-formaldehyde shell (comparative example 2), are more difficult to activate under given conditions of time, pressure and temperature. Similarly, the adhesive beads of comparative examples 1 and 2 demonstrated significantly reduced peel adhesion relative to the adhesive beads of example 17 after exposure to similar time, pressure and temperature conditions.

Table 2 also indicates that the adhesion afforded by beads according to the invention may be tailored to certain levels by appropriate manipulation of pressure and temperature conditions during activation. The exposure conditions utilized in Table 2 are representative of those which may be achieved upon heated press activation of the adhesive beads.

EXAMPLE 18

Example 18 describes the formation of adhesive beads according to the invention but wherein the essentially discontinuous organic polymer coating includes a ferromagnetic additive. More specifically, a reactor which included a two liter split flask equipped with a condenser, a motor driven stainless steel stirrer (agitator) having a speed control, a thermowell, heating lamps with a temperature control, and a nitrogen-gas inlet was constructed.

A dispersion of 1.5 g of ZnO, 0.30 g of PNVP and 350 g of deionized water was charged to the reactor and the temperature was set to 58° C. with agitation at 375 rpm. A degassed monomer premix comprising 1.0 g of MMA, 50 g of VOAc, 12.3 g of MAA, 237 g of IOA, 0.1809 g of IOTG, and 1.5 g of VAZO™ 64 was then added. After 1.5 hours, the temperature was increased to 65° C. and the agitation was increased to 425 rpm. After an additional 5.5 hours, the temperature was reset to 50° C. and 6.4 grams of a PMMA homopolymer nickel coated powder (described more fully below) and 6.4 grams of a micronized polyethylene were added. Agitation at 425 rpm was continued for 0.5 hour. The resulting coated beads were then filtered and dried with constant agitation in a fume hood under ambient conditions to give free-flowing beads having a moisture content of less than 1%.

The PMMA homopolymer nickel coated powder mentioned above was prepared by mixing 50 g of nickel powder (commercially available from INCO Alloys International Inc., Huntington, W.V.) with a mean particle size of 50.45 microns (as determined by Leads and Northrup, Microtrac, Full Range Analyzer, North Wales, Pa.) with a PMMA dispersion. The PMMA dispersion was made using the reactor set up described in example 2 and charging the flask with 10.0 g of PNVP, 300 g of MMA, and 1000 g of degassed, deionized water and heating to 55° C. with agitation at 250 rpm. The flask was then charged with 0.60 g of $K_2S_2O_8$ and the reaction was allowed to proceed for 4 hours at 55° C. The reaction mixture was then cooled to room temperature at which time about 0.01 g of hydroquinone was added to remove any residual initiator. The resulting PMMA latex was dried in a 65° C. oven for 15 hours and subsequently pulverized so as to provide a dry, granular PMMA homopolymer powder having an average particle size of less than about 1 μm in diameter. 5 g of the PMMA powder was dispersed in 45 g of methylethylketone and the entire 50 g of the PMMA dispersion was mixed with 50 g of the nickel powder.

When 2 g of the adhesive beads of example 18 measuring about 425 to 500 μm in diameter were placed in a 100×15 millimeter polystyrene petri dish, covered with a nonconductive material, and shaken vigorously by hand for 30 seconds, the beads displayed an electrostatic charge in the presence of a noncontact electrostatic voltmeter after a monolayer of the beads had been applied to a 2 cm by 2 cm adhesive coated glass plate, covered with a TEFLON™ sheet, and rolled once with a hard rubber roller.

When a permanent magnet was placed in the presence of the beads of this example, the beads were attracted to and clung to the magnet thereby demonstrating their magnetic responsiveness.

EXAMPLE 19

Example 19 describes the preparation of adhesive beads according to the invention and having a tackified rubber based adhesive core. More particularly, 128.9 g of CA-501 rubber based adhesive (available from Century Adhesives Corp., Columbus, Ohio) and 5.16 g of the dry, granular PMMA homopolymer powder prepared as described in example 18 were mixed, frozen using liquid nitrogen, and ground to create PMMA homopolymer powder coated rubber based adhesive beads according to the invention.

Reasonable variations and modifications of the foregoing specification and drawings are possible without departing from the scope of the invention which is defined in the accompanying claims.

The embodiments for which an exclusive property or privilege is claimed are defined as follows:

1. A method of forming an adhesive bead comprising a core that comprises a pressure sensitive adhesive material and an essentially discontinuous organic polymer coating disposed about said core, said method comprising the steps of (a) providing a core comprising a pressure sensitive adhesive material;

(b) providing a latex of an organic thermoplastic homopolymer or an organic thermoplastic copolymer;

(c) combining said core and said latex to form a mixture thereof;

(d) heating said mixture for a time and at a temperature sufficient to cause an essentially discontinuous coating of said organic thermoplastic homopolymer or organic thermoplastic copolymer to form about said core and to form said bead; and (e) drying said bead.

2. A method according to claim 1 wherein the core is provided by freezing and then grinding a pressure sensitive adhesive material so as to provide granular material thereof.

3. A method according to claim 1 wherein said latex is provided by emulsion polymerizing a first material selected from the group consisting of vinyl-group containing and acrylate group-containing monomers and, optionally, a polar monomer polymerizable with the first material.

4. A method according to claim 1 wherein the core is provided as an aqueous mixture.

5. A method according to claim 1 wherein the mixture formed in step (c) is an aqueous mixture.

6. A method of forming an adhesive bead comprising a core that comprises a pressure sensitive adhesive material and an essentially discontinuous organic polymer coating disposed about said core, said method comprising of the steps of:

(a) providing a core comprising a pressure sensitive adhesive material;

(b) providing a solvent dispersion of an organic thermoplastic homopolymer or an organic thermoplastic copolymer;

(c) combining said core and said dispersion to form mixture thereof;

(d) heating said mixture for a time and at a temperature sufficient to cause an essentially discontinuous coating of said organic thermoplastic homopolymer of organic thermoplastic copolymer to form about said core and to form said bead; and (e) drying said bead.

7. A method according to claim 6 wherein the core is provided by freezing and then grinding a pressure sensitive adhesive material so as to provide granular material thereof.

8. A method according to claim 6 wherein the mixture formed in step (c) is an aqueous mixture.

9. A method of forming an adhesive bead comprising a core that comprises a pressure sensitive adhesive material and an essentially discontinuous organic polymer coating disposed about said core, said method comprising the steps of:

(a) providing a latex of an organic thermoplastic homopolymer or an organic thermoplastic copolymer;

(b) drying said latex;

(c) grinding said dried latex to provide granular material thereof;

(d) preparing an aqueous mixture comprising said material and a core comprising a pressure sensitive adhesive material; and (d) applying said granular material to said core so as to provide an essentially discontinuous coating of said granular material about said core.

10. A method according to claim 1 wherein said pressure sensitive adhesive material comprises a copolymer which is the reaction product of a functional monomer copolymerizable with a monomer selected from the group consisting of alkyl acrylates, alkyl fumarates and alkyl maleates.

11. A method according to claim 10 wherein said copolymer comprises the reaction product of one or more acrylic acid esters of a non-tertiary alcohol having from 1 to 18 carbon atoms and a polar monomer copolymerizable with the acrylic acid ester.

12. A method according to claim 1 wherein said thermoplastic organic homopolymer comprises the polymerization product of a material selected from the group consisting of vinyl group-containing monomers and acrylate group-containing monomers or wherein said thermoplastic organic copolymer comprises the reaction product of a material selected from the group consisting of vinyl group-containing monomers and acrylate group-containing monomers and a polar comonomer copolymerizable with said material.

13. A method according to claim 13 wherein the polar comonomer is selected from the group consisting of acrylic acid, alkyl acrylic acids, acrylamide, alkyl acrylamides, fumaric acid, maleic acid, styrene sulfonic acid, citraconic acid, 1-vinyl-2-pyrrolidone, substituted acrylamides, vinyl chloride, vinyl acetate, 1-vinyl-4-pyrrolidone, and mixtures thereof.

14. A method according to claim 6 wherein said pressure sensitive adhesive material comprises a copolymer which is the reaction product of a functional monomer copolymerizable with a monomer selected from the group consisting of alkyl acrylates, alkyl fumarates and alkyl maleates.

15. A method according to claim 14 wherein said copolymer comprises the reaction product of one or more acrylic acid esters of a non-tertiary alcohol having from 1 to 18 carbon atoms and a polar monomer copolymerizable with the acrylic acid ester.

16. A method according to claim 6 wherein said thermoplastic organic homopolymer comprises the polymerization product of a material selected from the group consisting of vinyl group-containing monomers and acrylate group-containing monomers or wherein said thermoplastic organic copolymer comprises the reaction product of a material selected from the group consisting of vinyl group-containing monomers and acrylate group-containing monomers and a polar comonomer copolymerizable with said material.

17. A method according to claim 16 wherein the polar comonomer is selected from the group consisting of acrylic acid, alkyl acrylic acids, acrylamide, alkyl acrylamides, fumaric acid, maleic acid, styrene sulfonic acid, citraconic acid, 1-vinyl-2-pyrrolidone, substituted acrylamides, vinyl chloride, vinyl acetate, 1-vinyl-4-pyrrolidone, and mixtures thereof.

18. A method according to claim 9 wherein said pressure sensitive adhesive material comprises a copolymer which is the reaction product of a functional monomer copolymerizable with a monomer selected from the group consisting of alkyl acrylates, alkyl fumarates and alkyl maleates.

19. A method according to claim 18 wherein said copolymer comprises the reaction product of one or more acrylic acid esters of a non-tertiary alcohol having from 1 to 18 carbon atoms and a polar monomer copolymerizable with the acrylic acid ester.

20. A method according to claim 9 wherein said thermoplastic organic homopolymer comprises the polymerization product of a material selected from the group consisting of vinyl group-containing monomers and acrylate group-containing monomers or wherein said thermoplastic organic copolymer comprises the reaction product of a material selected from the group consisting of vinyl group-containing monomers and acrylate group-containing monomers and a polar comonomer copolymerizable with said material.

21. A method according to claim 20 wherein the polar comonomer is selected from the group consisting of acrylic acid, alkyl acrylic acids, acrylamide, alkyl acrylamides, fumaric acid, maleic acid, styrene sulfonic acid, citraconic acid, 1-vinyl-2-pyrrolidone, substituted acrylamides, vinyl chloride, vinyl acetate, 1-vinyl-4-pyrrolidone, and mixtures thereof.

* * * * *